Dec. 14, 1937.  A. COHEN  2,102,406
BRAKING APPARATUS
Filed April 11, 1935  4 Sheets-Sheet 3

Inventor
Abraham Cohen

Dec. 14, 1937.  A. COHEN  2,102,406
BRAKING APPARATUS
Filed April 11, 1935  4 Sheets-Sheet 4

INVENTOR.
Abraham Cohen

Patented Dec. 14, 1937

2,102,406

UNITED STATES PATENT OFFICE 2,102,406

BRAKING APPARATUS

Abraham Cohen, New Haven, Conn.

Application April 11, 1935, Serial No. 15,851

8 Claims. (Cl. 188—71)

This invention relates to fluid pressure operated brakes and more particularly to fluid pressure operated brakes for motor vehicles. In certain respects, this invention is similar to that embodied in my copending application for patent, Serial No. 644,108, filed November 23, 1932. This last-mentioned application for patent relates particularly to a fluid pressure operated brake including a frusto-conical brake shoe which is actuated by a plurality of stationary pistons and movable cylinders.

One object of the present invention is to provide a brake that is simple in construction and very unlikely to get out of order.

A further object of the invention is to provide a brake that is compact in form and effective.

A further object of the invention is to provide an effective brake made of a minimum number of parts.

A further object of the invention is to provide a brake associated with a vehicle wheel whereby the parts of the brake are readily demountable and accessible for repair, inspection, and the like.

A further object of the invention is to provide a brake made up of such parts which readily lend themselves to standardization so that a new part may be easily interchanged for a worn part.

A further object of the invention is to provide a simple and inexpensive brake, yet one which will be exceedingly effective for the purpose for which it is designated.

With these and other objects in view, the invention resides in the novel features of construction and combination and arrangements of parts as more fully hereinafter described and claimed.

In the accompanying drawings I have shown one embodiment of my invention,

Figure 1:
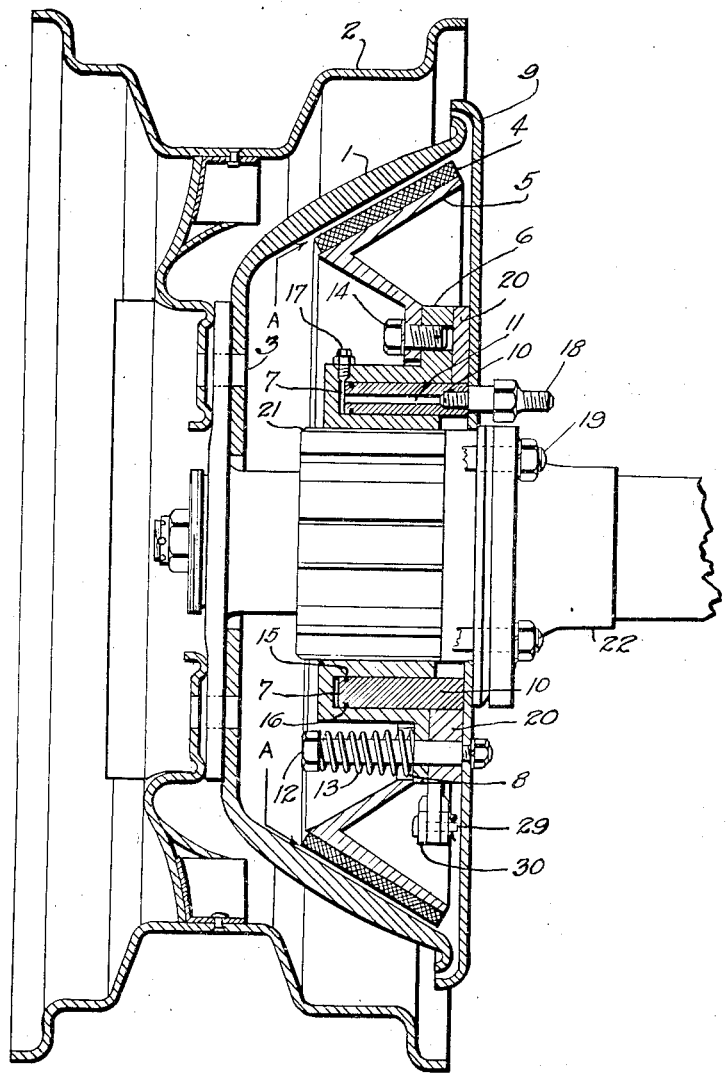
Figure 1 is a sectional view of a rear wheel of a vehicle showing the assembled elements of my braking apparatus.
Figure 2:
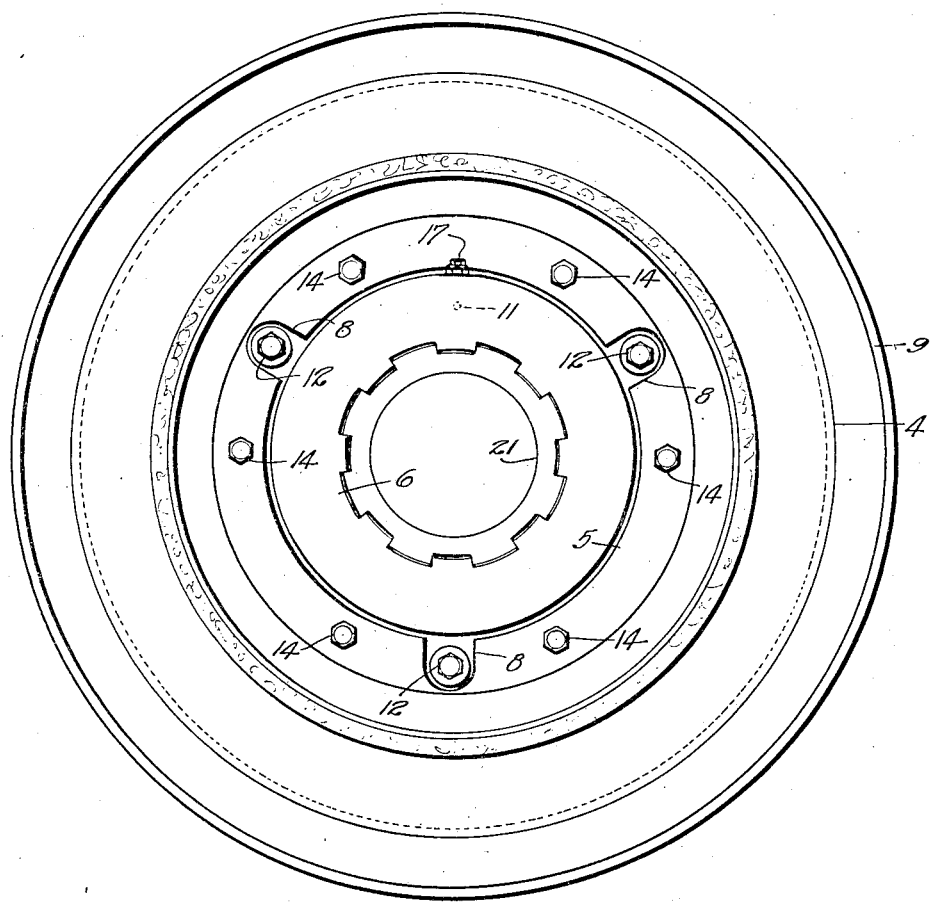
Figure 2 is a view on line A—A of Figure 1 looking in the direction of the arrows.
Figure 3:
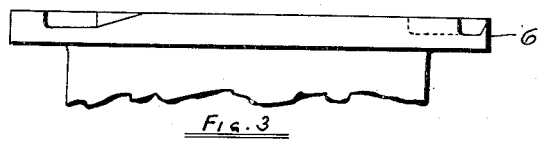
Figure 3 is a detail elevational view, partly broken away, of slidable hub 6 shown in the assembled view in Figure 1.
Figure 4:
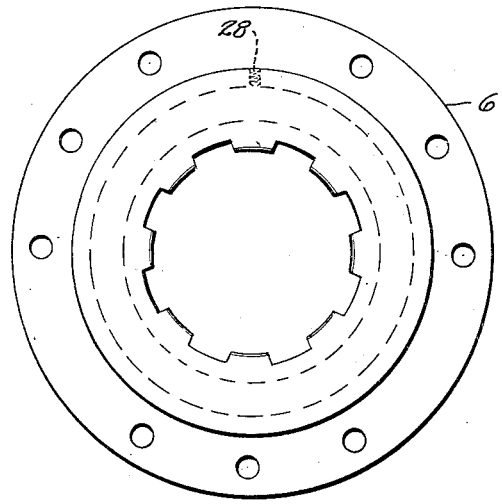
Figure 4 is a detail end view of the slidable hub 6 shown in Figure 3.
Figure 5:
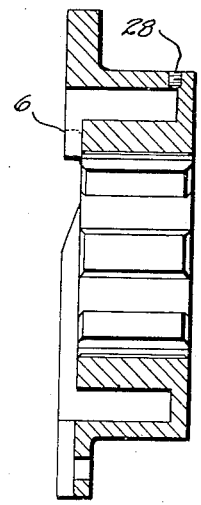
Figure 5 is a detail sectional view of the entire slidable hub 6.
Figure 6:
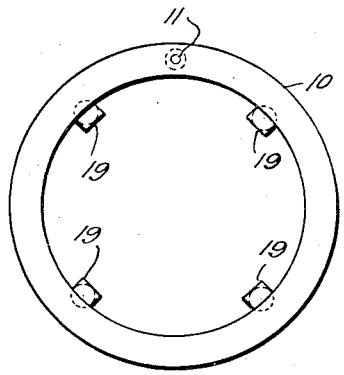
Figure 6 is a detail end view of the stationary piston 10, shown in the assembled view in Figure 1.
Figure 7:
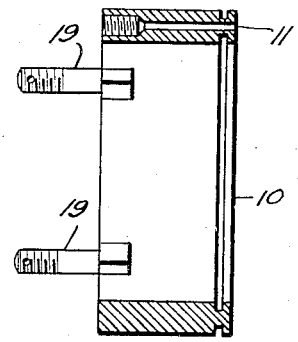
Figure 7 is a detail sectional view of the stationary piston 10 shown in Figure 6.
Figure 9:
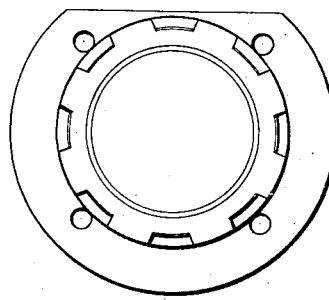
Figure 9 is a detail view in section of splined hub 21 shown in Figure 8 looking along line B—B of Figure 8 in the direction of the arrows.
Figure 8:
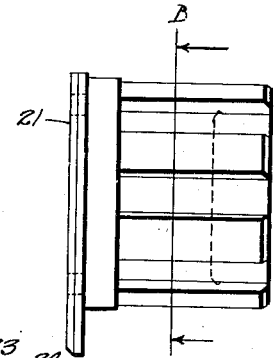
Figure 8 is a detail side view of the splined hub 21 shown in the assembled view in Figure 1.

Referring to the drawings, reference numeral 1 designates the brake drum which is secured to the wheel 2 of a vehicle, not shown, at 3, by suitable means such as bolts, not shown. The frusto-conical brake lining 4 is fastened to the brake shoe 5 by rivets or other suitable means not shown. The slidable hub or ring piece 6 is attached to the brake shoe by screws 14. A single annular cavity 7 is formed in one side of the slidable hub or ring piece 6. The single stationary annular piston 10, which is bored at 11, engages the side walls of annular cavity 7 so that the slidable hub or ring piece 6 may slide thereon.

While I have shown but a single bore 11 in the piston 10, said piston 10 may be provided with a plurality of bores spaced around it.

Attached to the base 9 are the bolts 12 which slidably engage holes in ring piece 6 and pass through cut out portions 8 in the brake shoe 5. The springs 13 confined between the heads of bolts 12 and the flange on the slidable hub or ring piece 6 are under compression and tend to move the brake shoe away from the drum 1 when fluid pressure acting on the ring piece or slidable hub 6 ceases. Base 9 is fastened to axle housing hub over splined hub 21 by means of piston 10 and studs 19 which are machined out of piston 10.

Piston ring 16 encircles annular piston 10, while annular piston 10 encircles piston ring 15. While I have shown but one piston ring on the outside and one piston ring on the inside of annular piston 10, many more piston rings may be used if desired. Fluid pressure inlet fitting 18 is attached to the bore 11. It is, of course, understood that if more than one bore 11 is utilized, then each bore is to have a fitting 18 and all the fittings 18 are to be connected by a suitable manifold. Bleeder screw-plug 17 communicates with cavity 7 so that air may be purged from the fluid pressure system at this point.

Figure 10:
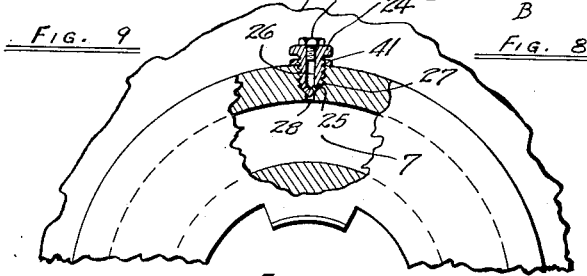
Figure 10 is a detail view, partly in section of the bleeder screw plug 17 shown in the assembled view in Figure 1.

The purging arrangement designated by the reference numeral 17 in the assembled view in Figure 1 and which is shown in detail in Figure 10 includes a plug 23, which is screwed into valve 24 which is bored at 26. The bored valve 24, when in screwed down position, contacts the seat 25 which is formed in the ring piece 6. When valve 24 is in slightly unscrewed position, port 28 connects cavity 7 with bore 26 through ports 27. When purging, plug 23 is removed and a piece of hose with a suitable fitting (neither the hose nor fitting is shown) is inserted in place of plug 23. Valve 24 is then unscrewed a turn or two to remove it from its seat 25. The matter to be purged then passes from cavity 7, upward through opening or port 28, through ports 27, through bore 26 and out of system. Valve 24 is then screwed down tight again and plug 23 is replaced. A lock nut 41 secures valve 24 in place.

Figure 11:
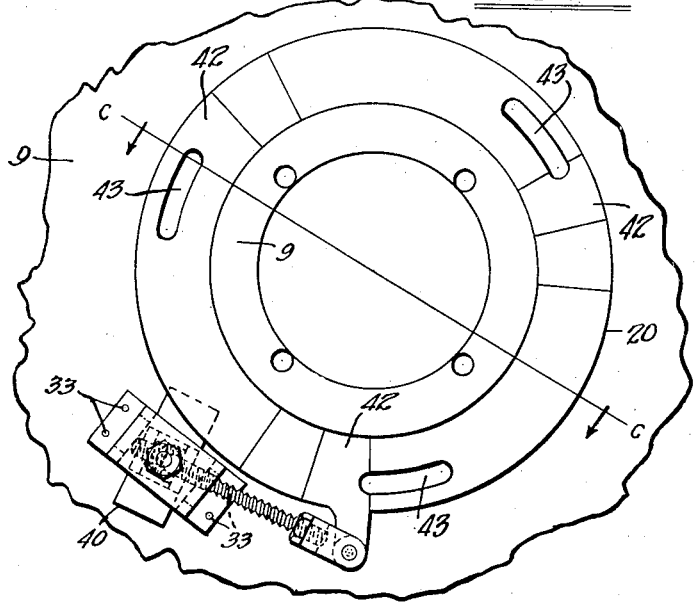
Figure 11 is detail plan view of adjustment cam 20 shown in the assembled view in Figure 1.
Figure 12:
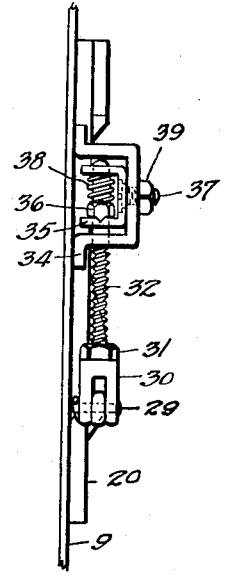
Figure 12 is a detailed end view of the cam 20 shown in Figure 11, looking toward line C—C in the direction of the arrows.

The adjustment cam 20 shown in the assembled view in Figure 1 and which is shown in detail in Figures 11 and 12 has an adjusting arrangement which includes a clevis pin 29 which fastens buckle 30 to adjustment cam 20. The threaded rod 32 which is screwed into buckle 30 is locked in place by lock nut 31. Plate 34 is fastened to base 9 by means of rivets 33 and a U-shaped casting 35 is fastened to plate 34 by means of a pivot bolt 37 and is locked in place by nut 39. The adjustment nut 36 is screwed on threaded rod 32 and is held in place by spring 38. The opening 40 in base 9 provides an accessible place to adjust nut 36, when the brake lining becomes worn, to take up on threaded rod 32 which in turn will move cam 20, so as to push out ring piece 6 which is fastened to the brake shoe 5 axially towards the brake drum 1 causing the worn working face of the brake lining 4 to assume the non-worn working position. A removable plate (not shown) covers the opening 40 to prevent dust, dirt, water, etc. from interfering with operation of the mechanism. The three raised portions on the cam 20 are designated by numerals 42. The slots 43 in the cam 20 accommodate the bolts 12.

The operation of the brake will be apparent from the foregoing description. The brake shoe 5 is normally retained in spaced position from brake drum 1 by springs 13. The pressure of the spring forces the ring piece 6 and the brake shoe 5, which is attached thereto, toward the base 9 and keeps the brake lining out of engagement with brake drum 1. The brake drum revolves with the wheel; the brake shoe is non-rotatable and is only slidable in a horizontal direction. The base 9 is stationary, being supported and fixed to the axle housing. When it is desired that the brake be operated, fluid under pressure is admitted to inlet 18, from whence it passes through bore 11 to cavity 7. This forces the shoe toward the drum against the pressure of springs 13 and the brake lining 4 will engage the drum 1 and thus retard the revolution of the wheel or effect a braking action.

It will be noted that in order to replace a worn brake lining, it is only necessary to remove the wheel, which is of the readily removable type, to remove screws 14, remove the shoe 5 and to replace it with a new shoe on which is a new brake lining, then to replace screws 14 and the vehicle wheel.

It is to be understood that the form of the invention herewith shown and described is to be taken as a preferred example of the same, and that various changes in the shape, size, and arrangements of parts may be resorted to without departing from the spirit of the invention or the scope of the subjoined claims.

Having thus described my invention, what I claim is:

1. In a fluid pressure brake, a brake drum, a base member, a brake shoe slidably supported on said base member, means for applying fluid pressure to said brake shoe, said last named means including a stationary annular piston fastened to said base member cooperating with a movable annular cylinder located directly on said brake shoe.

2. In a fluid pressure brake, a brake drum, a base member, a brake shoe slidably supported on said base member, a brake lining attached to said brake shoe, means for applying fluid pressure to said brake shoe, said last named means including an annular piston cooperating with an annular cylinder, and cam means for adjusting the position of the brake shoe relative to the brake drum when the said brake lining becomes worn, said cam means including an annular cam with one or more raised portions thereon so positioned and arranged that when the cam is turned about its axis, the position of the brake shoe relative to the brake drum is changed, and screw actuated means for turning said cam about its axis.

3. In a fluid pressure brake, a brake drum, a base member fixed stationary relative to a splined hub, a brake shoe attached to an annular cylinder, a stationary annular piston fastened to said base member, said annular cylinder slidably cooperating with said annular piston and said splined hub.

4. In a fluid pressure brake, a brake drum, a base member fixed stationary relative to a splined hub, a brake shoe attached to an annular cylinder, a stationary annular piston fastened to said base member, said annular cylinder slidably cooperating with said annular piston and said splined hub, means for applying fluid pressure to said cylinder, and means for purging said cylinder.

5. In a fluid pressure brake, a brake drum, a base member fixed stationary relative to a splined hub, a brake shoe attached to an annular cylinder, a stationary annular piston fastened to said base member, said annular cylinder slidably cooperating with said annular piston and said splined hub, and cam means for adjusting the position of the brake shoe relative to the brake drum.

6. In a fluid pressure brake, a brake drum, a base member fixed stationary relative to a splined hub, a brake shoe attached to an annular cylinder, a stationary annular piston fastened to said base member, said annular cylinder slidably cooperating with said annular piston and said splined hub, means for applying fluid pressure to said cylinder, means for purging said cylinder, and cam means for adjusting the position of the brake shoe relative to the brake drum.

7. In a fluid pressure brake, a brake drum, a base member, a brake shoe slidably supported on said base member, means for applying fluid pressure to said brake shoe, said last named means including a stationary annular piston fastened to said base member cooperating with a movable annular cylinder located directly on said brake shoe, and cam means for adjusting the position of the brake shoe relative to the brake drum.

8. In a fluid pressure brake, a brake drum, a base member, a brake shoe slidably supported on said base member, means for applying fluid pressure to said brake shoe, said last named means including a stationary annular piston fastened to said base member cooperating with a movable annular cylinder located directly on said brake shoe, cam means for adjusting the position of the brake shoe relative to the brake drum, and means for purging said annular cylinder.

ABRAHAM COHEN.